United States Patent [19]

Ujita et al.

[11] Patent Number: 4,714,130

[45] Date of Patent: Dec. 22, 1987

[54] AXLE REDUCTION APPARATUS FOR TRACTOR

[75] Inventors: Tsugunobu Ujita; Seiichi Takahashi, both of Sakai, Japan

[73] Assignee: Kubota, Ltd., Osaka, Japan

[21] Appl. No.: 31,201

[22] Filed: Mar. 26, 1987

Related U.S. Application Data

[63] Continuation of Ser. No. 842,051, Feb. 14, 1986, abandoned, which is a continuation of Ser. No. 586,499, Mar. 5, 1984, abandoned.

[30] Foreign Application Priority Data

Jul. 28, 1983 [JP]   Japan ................................ 58-138977

[51] Int. Cl.$^4$ ............................................ B60K 17/30
[52] U.S. Cl. ...................................... 180/262; 74/391
[58] Field of Search ............... 180/242, 260, 261, 262; 74/391

[56] References Cited

U.S. PATENT DOCUMENTS

| | | | |
|---|---|---|---|
| 4,424,874 | 1/1984 | Koike et al. | 74/391 |
| 4,424,879 | 1/1984 | Sonzogni | 74/391 |
| 4,429,914 | 4/1984 | Nishihara | 180/261 |

FOREIGN PATENT DOCUMENTS

| | | | |
|---|---|---|---|
| 2315639 | 6/1975 | France | 180/262 |
| 1275 | 1/1980 | Japan | 180/262 |
| 104413 | 6/1982 | Japan | 180/260 |
| 191166 | 11/1982 | Japan | 180/260 |

Primary Examiner—Albert J. Makay
Assistant Examiner—Steven E. Warner
Attorney, Agent, or Firm—Edwin E. Greigg

[57] ABSTRACT

The invention provides an axle reduction apparatus for a tractor having a planetary reduction mechanism mounted between an axle and an axle drive shaft. The axle carries an integrated gear consisting of an input gear to receive drive from the drive shaft and a sun gear of the planetary reduction mechanism.

7 Claims, 10 Drawing Figures

AXLE REDUCTION APPARATUS FOR TRACTOR

This is a continuation of copending application Ser. No. 842,051 filed Feb. 14, 1986, which is a continuation of Ser. No. 586,499 filed Mar. 5, 1984, both now abandoned.

BACKGROUND OF THE INVENTION

1. Field of the Invention

This invention relates to a reduction apparatus for a tractor axle utilizing a planetary reduction mechanism.

2. Description of the Prior Art

Tractor axle reduction apparatus utilizing a planetary reduction mechanism have been proposed in Japanese Utility Model Publication Nos. 56-12433 and 56-12434. These have basically the same construction and therefore the former is referred to herein.

This prior art construction which is illustrated in FIG. 10 of the accompanying drawings is capable of a large reduction ratio since a planetary reduction mechanism is employed. However, according to this construction, an axle 100 is in tubular form and contains a drive shaft 100A therein, which require large bearings 110 to support the axle 100. Thus, the construction has a disadvantage of requiring a large axle reduction casing 104 for use in a tractor involving great torque transmission, and is therefore applicable only to small tractors involving small torque transmission.

A carrier 107 is attached to an outer periphery of a wheel boss 106 mounting front wheels 118 and having a hollow portion 106a. Planetary gears 101 are rotatably attached to the carrier 107. Teeth of the individual planetary gears 101 are projected inwardly of the hollow portion 106a of the wheel boss 106 and outwardly of the outer periphery of the carrier 107, respectively. A drive shaft 113 carrying a sun gear 116 projecting from a front gear case 104 engages the wheel boss 106 thereby to rotatably support the wheel boss 106 by the front gear case 104. The planetary gears 101 are in engagement with a sun gear 116. The front gear case 104 carries an internal gear 111 engaging the planetary gears 101. At the wheel boss 106 there is formed a hollow portion 106a. A ring-shaped carrier 107 is in engagement with a spline portion 106b defined in the outer periphery of the wheel boss 106. Gear pins 108 are fixedly secured to the carrier 107 on a circumference having as its center an axis of the wheel boss 106. The planetary gears 101 respectively are in rotatable engagement with the gear pins 108 via needle bearings 109 with teeth of the planetary gears 101 being projected inwardly of the hollow portion 106a of the wheel boss 106 and outwardly of an outer periphery of the carrier 107. Outwardly of the front gear case 104, there is provided a ring-shaped inner gear 111 disposed in the direction of the outer periphery of the planetary gears 101 and meshing the planetary gears 101. A leading edge of a drive shaft 113 rotated by a universal joint 112 is supported by the metal case 105 through a bearing 114 with the leading edge being projected into the hollow portion 106a of the wheel boss 106. The metal case 105 along with the inner gear 111 is attached to the front gear case 104 by bolts 115. A sun gear 116 meshing the planetary gears 101 inside the hollow portion 106a is attached to the drive shaft 113 inwardly of the carrier 107.

SUMMARY OF THE INVENTION

The primary object of this invention is to provide an axle reduction apparatus for a tractor which permits the axle reduction casing to be designated compact while providing a large reduction ratio, thereby securing sufficient space in lower portions of the tractor.

In order to achieve the above object, an axle reduction apparatus according to this invention comprises a hollow axle reduction casing including half case members secured to each other with a ring gear therebetween, an axle disposed centrally of the axle reduction casing and supported at an inner end and at an intermediate portion adjacent an outer end thereof by the half case members through bearings, respectively, an integrated gear rotatably mounted on the axle adjacent the inner end thereof and including an input gear and a sun gear formed to be integral with each other, the integrated gear including a boss portion extending from the sun gear in an outward direction, a bearing provided on a side face of the input gear of the integrated gear and supported by an inner wall of an inner one of the half case members circumferentially of the bearing of the axle, and a carrier fixed to the axle adjacent the outer end thereof and carrying planet gears in mesh with the ring gear and the sun gear, respectively.

The construction as set forth above realizes a very small axle reduction casing into which a planetary reduction mechanism is incorporated to provide a high reduction ratio at the axle portion.

More particularly, the invention, in addition to the basic advantage of obtaining a very high reduction ratio by means of the planetary reduction mechanism housed in the reduction casing formed of the half case members, has further advantages as follows:

The axle is supported at the inner end and at an intermediate portion adjacent the outer end thereof by the half case members through bearings, respectively, utilizing a full transverse length of the reduction casing. Therefore the construction readily withstands a load of the tractor body falling on the axle. Since the sun gear is not directly supported by the axle, the sun gear is free from a bending load of the axle.

Furthermore, there occurs no inclination of the sun gear since it is supported over a long span. Since the integrated gear comprising the sun gear and the input gear is supported at the inner face thereof by means of a bearing circumferentially of the axle bearing, there is no increase in the transverse dimensions in spite of a large bearing capacity. Such a construction realizes the axle reduction casing to be formed very small thereby securing sufficient space in the lower portions of the tractor.

Other advantages of the invention will be apparent from the following description.

BRIEF DESCRIPTION OF THE DRAWINGS

The drawings illustrate axle reduction apparatus according to this invention, in which.

DETAILED DESCRIPTION OF THE PREFERRED EMBODIMENTS

Figure 1:
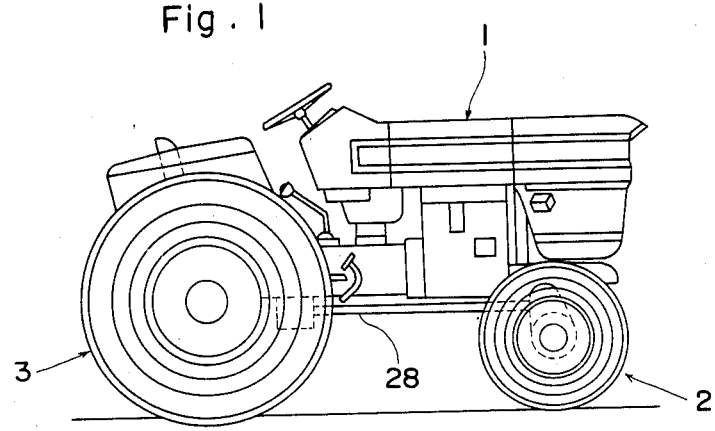
FIG. 1 is a side elevation of a tractor.

Referring to FIG. 1, a tractor 1 of the two axle and four wheel type comprising a right and left pair of front wheels 2 and a right and left pair of rear wheels 3. In this embodiment the tractor 1 is a four wheel drive tractor in which the dirigible front wheels 2 as well as the rear wheels are driven.

Figure 2:
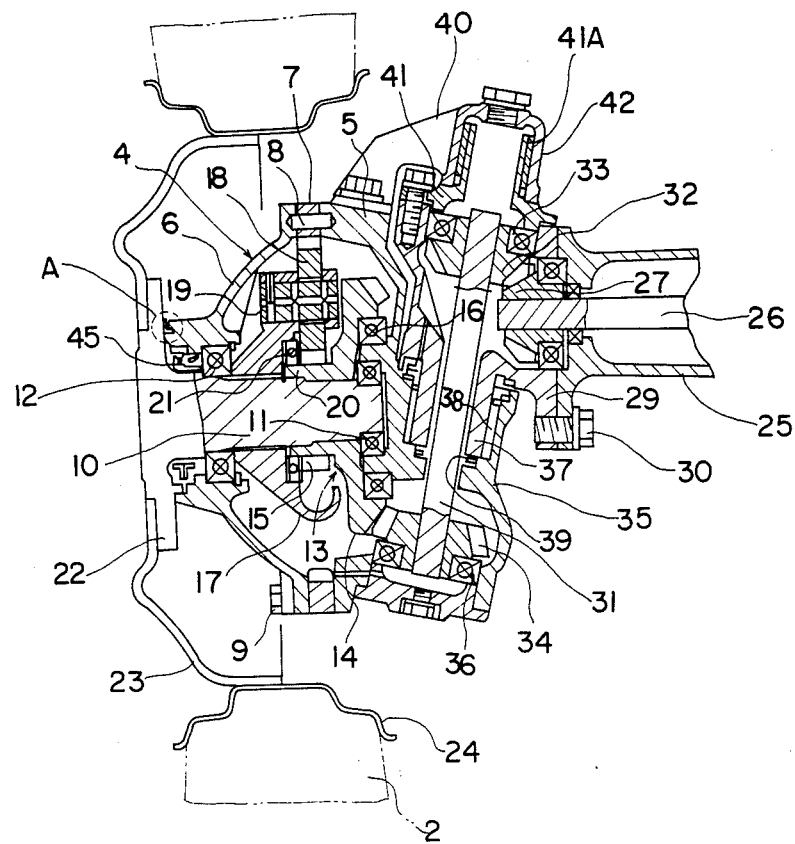
FIG. 2 is a sectional view of an axle reduction apparatus according to a first embodiment of the invention.

Referring to FIG. 2, number 4 denotes a hollow two-piece axle reduction casing comprising half case members 5 and 6 fixed to each other by knock pins 8 and bolts 9, with a ring gear 7 therebetween.

An axle 10 is disposed to extend transversely in a central portion of the axle reduction casing 4. The axle 10 is supported at an inner end and at an intermediate portion adjacent an outer end thereof by the half case members 5 and 6 through ball bearings 11 and 12, respectively.

Number 13 denotes an integrated gear rotatably mounted on the axle 10 and comprising an input gear 14 and a sun gear 15 formed to be integral with each other. A bearing 16 is provided on a side face of the input gear 14 of the integrated gear 13 and supported by an inner wall of an inner one of the half case members 5 circumferentially of the bearing 11 of the axle 10.

Number 17 denotes a carrier fixed to the axle 10 adjacent the outer end thereof such as by splines and keys. The carrier 17 supports, through axes 19, a plurality of planet gears 18 in mesh with the ring gear 7 and the sun gear 15, respectively.

Thus, the carrier 17, ring gear 7 and sun gear 15 constitute a planetary reduction mechanism.

The integrated gear 13 includes a boss portion 20 extending in an outward direction from the sun gear 15 and supported by an inner portion of the carrier 17 through a bearing 21.

The axle reduction apparatus of FIG. 2 is adapted for the front wheels 2. The axle 10 defines a flange 22 at the outer end thereof, and a rim 24 is attached to the flange 22 through a disc 23.

Number 25 denotes a hollow shaft housing and supporting a drive shaft or an output shaft 26 of a differential. A bevel pinion 27 is fixed to an outer end of the drive shaft 26.

The hollow shaft 25 is supported at a longitudinally intermediate portion thereof by a tractor body to be oscillatable about an axis of an input shaft of the differential. The input shaft of the differential is operatively connected to a propeller shaft 28 shown in FIG. 1.

Number 29 denotes a transmission casing bolted as at 30 to an outer end of the hollow shaft 25. A king pin shaft 31 is housed in the transmission casing 29 to extend vertically, the king pin shaft 31 operatively connecting the drive shaft 26 to the input gear 14 of the integrated gear 13.

According to this embodiment, the king pin shaft 31 carries a bevel pinion 32 splined to an upper portion thereof and in mesh with a top of the bevel pinion 27.

The bevel pinion 32 is suppoted by the transmission casing 29 through a bearing 33. Further, the king pin shaft 31 carries a bevel pinion 34 splined to a lower portion thereof and in mesh with a bottom of the input gear 14. The pinion 34 is supported through a bearing 36 by a case portion 35 extending from a bottom portion of the inner half case member 5.

The transmission casing 29 defines a tubular portion 37 at a lower portion thereof extending into an upper portion of the case portion 35 to be relatively rotatably supported thereby through a needle bearing 38 and a thrust bearing 39.

Furthermore, the axle reduction casing 4 adapted for the front wheels is held in position outside the transmission casing 29 by an arm 40 such that the axle reduction casing 4 is locked against inclination toward the transmission casing 29 but rotatable relative thereto about an axis of the king pin shaft 31.

To be more particular, a lid member 41 including a support 41A and acting also as bearing retaining is bolted to the top of the transmission casing 29 to be coaxial with the king pin shaft 31. A cap 42 extends from the arm 40 bolted to the top of the axle reduction casing 4, the cap 42 being rotatably fitted on the support 41A of the lid member 41. Thus, the axle reduction casing 4 is rotatable or oscillatable about the axis of the king pin shaft 31 to render the front wheels dirigible.

Figure 3:
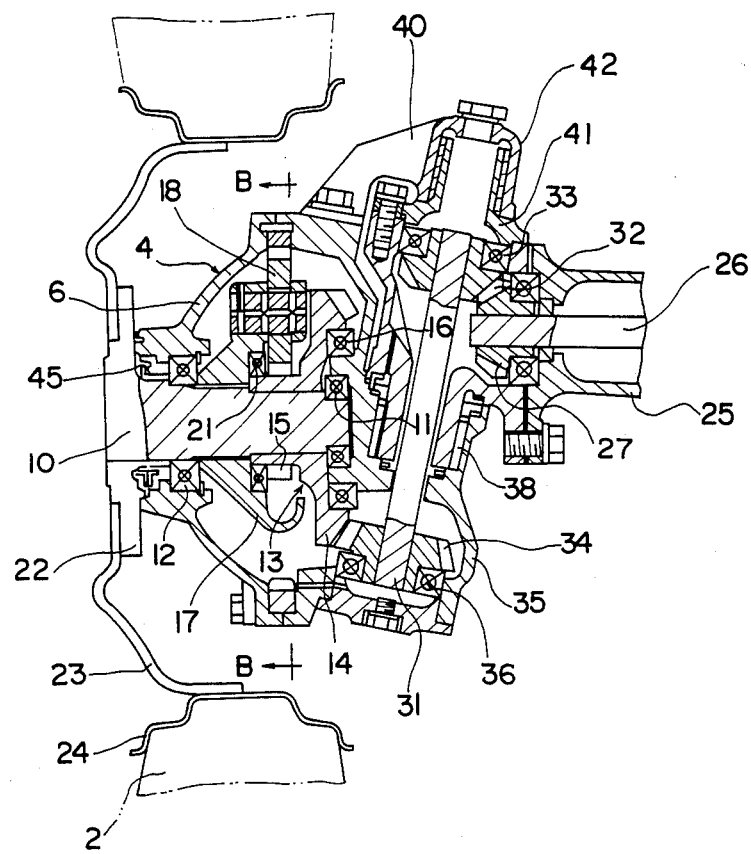
FIG. 3 is a sectional view of an axle reduction apparatus according to a second embodiment of the invention.
Figure 4:
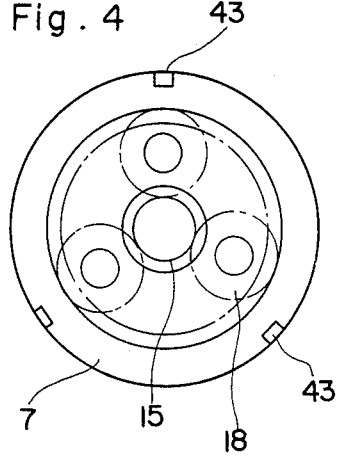
FIGS. 4 and 5 are schematic sectional views taken on line B—B of FIG. 3, respectively.
Figure 5:
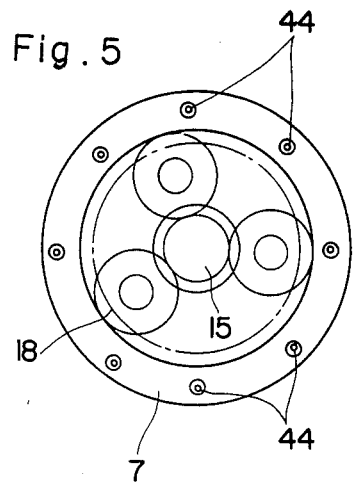

FIGS. 3 through 5 show improvements on the support structure for the ring gear 7 which is a constituent element of the planetary reduction mechanism. In FIGS. 3 and 4, the ring gear 7 is fixedly mounted between the half case members 5 and 6 by means of keys 43 disposed peripherally and radially. The use of the keys 43 for securing the ring gear 7 provides an improvement on the arrangement of FIG. 2 wherein torque is received by the knock pins 8 which requires a material thickness of the ring gear 7 to a wasteful extent and an unduly large diameter thereof and hence to a disadvantage of high material cost.

The attachment structure utilizing the keys 43 is also applicable to attachment of a pressure plate of a disc brake provided for a rear wheel.

FIG. 5 shows an example employing spring pins 44 in place of the knock pins 8. This arrangement is made possible by drilling perforation work which is advantageous in terms of economy over the arrangement of FIG. 2 which requires reamer shaping. In addition, the arrangement of FIG. 5 is capable of an aligning function since the ring gear 7 is permitted to move radially to a certain extent by virtue of the elasticity of the spring pins 44 when the sun gear 15 and the carrier 17 rotate in unison.

The construction shown in FIG. 3 is the same as that of FIG. 2 except the attaching structure for the ring gear 7, and therefore like numeral are affixed to like members.

Figure 6:
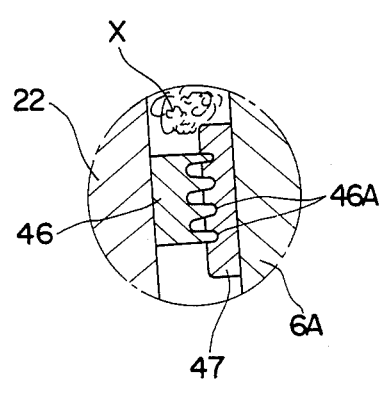
FIG. 6 is an enlarged sectional view taken from a portion shown by an arrow A of FIG. 2.

FIG. 6 is an enlarged view of the part of FIG. 2 indicated by an arrow A and corresponding to a protection for a seal 45. A ring member 46 made of a hard metal and including peripheral projections 46A is fixed to one of opposite faces of the flange 22 and a boss 6A of the outer half case member 6 such that the ring member 46 is coaxial with the axle 10, and a ring 47 made of a soft metal is fixed to the other of the opposte faces to be bitten into by the projections 46A. The projections 46A biting into the ring 47 provide a labyrinth structure to prevent mud, grass and other foreign matter X from entering radially inwardly. The projections 46A are rotatable together with the axle 10 to assure the biting engagement with the ring 47.

Figure 7:
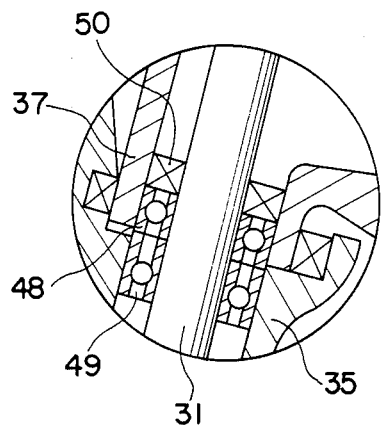
FIG. 7 is an enlarged sectional view showing a modification of a support structure between a transmission casing and a reduction casing.

FIG. 7 shows an improved connection between the tubular portion 37 of the transmission case 29 and the extending case portion 35. The king pin shaft 31 is supported at the top and bottom by means of the bearings 33 and 36 as shown in FIG. 2, an intermediate portion of the king pin shaft 31 being supported by bearings 48 and 49. The bearings 48 and 49 are arranged without an axial space therebetween as shown. In particular, in the prior art a collar is provided between the bearings 48 and 49 and oil seals are fitted to be axially juxtaposed with each other on an outer periphery of the collar, whereas in the illustrated example an oil seal 50 is mounted on the bearings 48 to allow the king pin shaft 31 to be thin.

Figure 8:
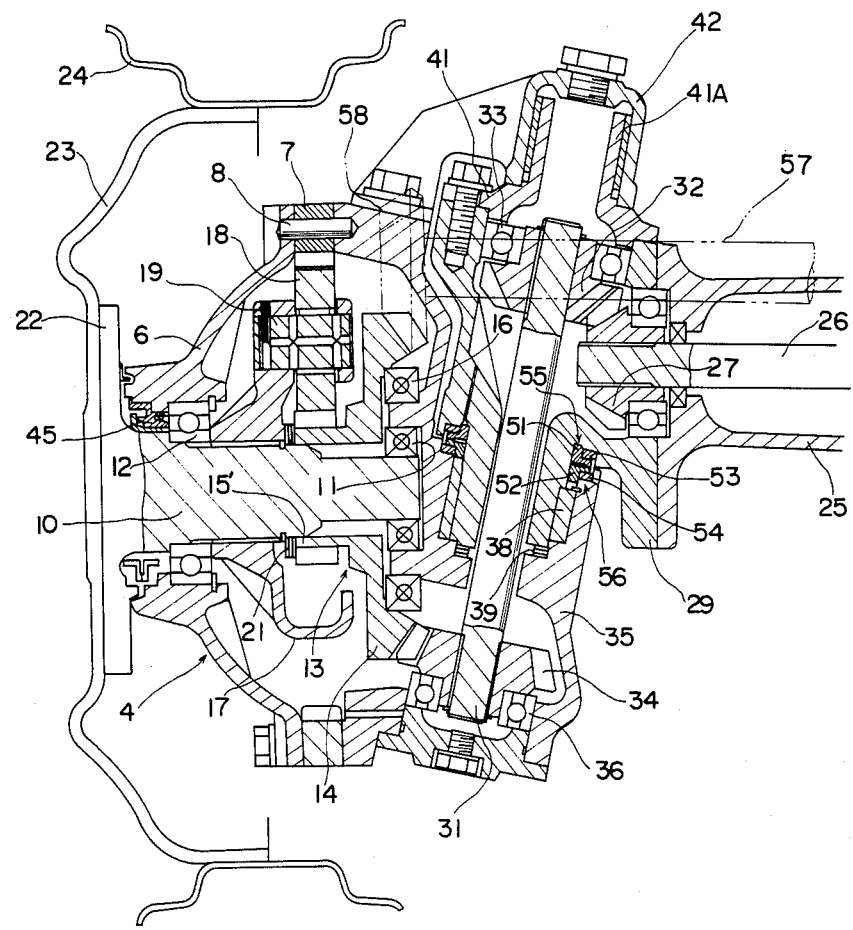
FIG. 8 is a sectional view of an axle reduction apparatus according to a third embodiment of the invention.
Figure 10:
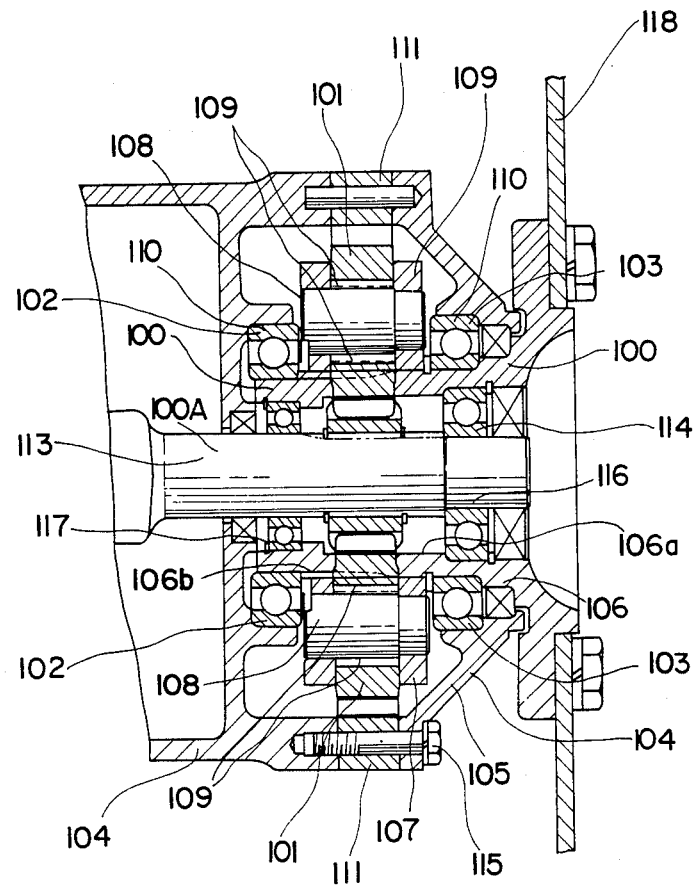
FIG. 10 is a sectional view of a principal portion of a prior art apparatus.

FIG. 8 shows a further embodiment of the invention comprising floating seals 55 and 56 provided at the connection between the transmission casing 29 and the extending case portion 35. The arrangement includes ring collars 51 and 52, each having an L-shape section, arranged one on top of the other and allowing a certain extent of vertical play, and oil seals 55 and 56 fitted around the collars 51 and 52. This arrangement is an improvement on a known construction using combined seals or the like from which oil often leaks. In such a prior construction there has been oil leakage caused by vertical plays which are due to axle flexions, bending of the king pin shaft and the like, and causes of seal breaks caused by metal power mixing thereinto. The above floating seals 55 and 56 eliminate all these disadvantages.

Furthermore, in the example shown in FIG. 8 a thrust needle bearing is employed as the bearing 21. Other aspects of this embodiment are the same as those of the embodiments shown in FIGS. 2 and 3 and common components are affixed with like numerals.

Also, FIG. 8 schematically shows the axle reduction apparatus including a planetary gear mechanism made applicable to the rear wheel by placing a gear 58 of a differential output shaft 57 for the rear wheels in mesh with the input gear 14 of the integrated gear 13 as shown. In this instance, the integrated gear 13 in the bevel form as shown may be replaced with a spur gear as may be the gear 58, and then the reduction case 4 is fixed to the tractor body.

Figure 9:
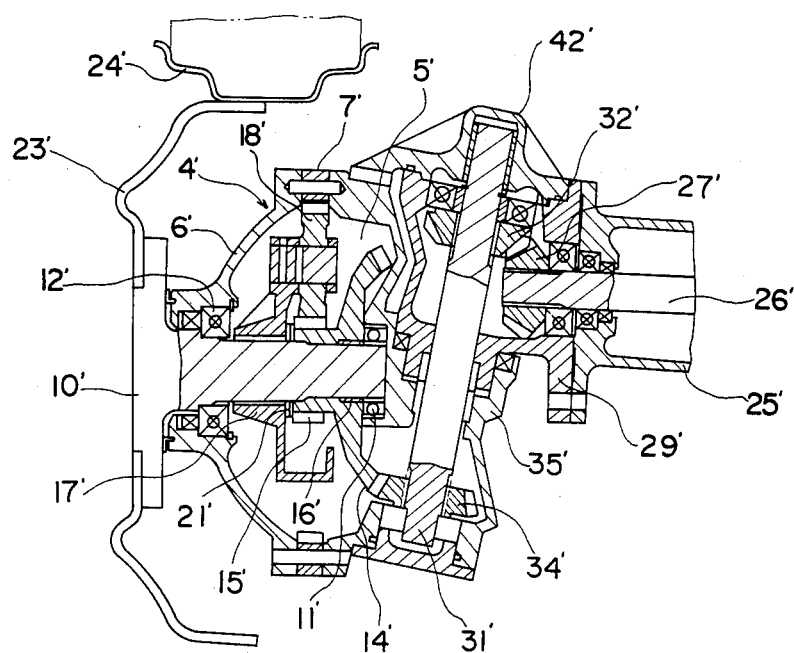
FIG. 9 is a sectional view of a further modified embodiment of the invention.

FIG. 9 shows a modified embodiment of this invention in which a needle bearing 16' is used in place of the bearing 16 to support the integrated gear 13 at the inner face thereof as in the foregoing embodiments, the outer end of the integrated gear 13 being supported by means of a needle bearing 21'. This embodiment, like the preceding embodiments, has the advantage of the casing 4' having a simple and compact construction, and besides produces a floating effect for the sun gear 15'.

Components of the embodiment of FIG. 9 common with those of the preceding embodiments are affixed with like numerals, each with a prime mark ('), and are not particularly described.

Functions of this invention are described next. In the examples of FIGS. 2, 3 and 8 torque from the differential output shaft or drive shaft 26 is transmitted to the input gear 14 by way of the king pin shaft 31. When the embodiment of FIG. 8 is used for a rear wheel, torque is transmitted from the differential output shaft 57 to the input gear 14.

In any case the sun gear 15 integral with the input gear 14 is rotated by the torque transmitted from the differential, and the sun gear 15 rotates the planet gears 18 in mesh therewith, the revolution of the latter being transmitted to the axle 10. Thus, the planetary gear mechanism drives one of the front wheels 2 and the rear wheels 3 through the axle 10 by a high reduction ratio.

The axle 10 is supported at the inner end by the bearing 11 and at the outer end by the bearing 12, utilizing a full transverse length of the reduction casing 4. Therefore the construction readily withstands a load of the tractor body falling on the axle 10.

Since the sun gear 15 is not directly supported by the axle 10, the sun gear 15 is free from a bending load of the axle 10.

Further, there occurs no inclination of the sun gear 15 since it is supported over a long span. Since the integrated gear 13 is supported at the inner face thereof circumferentially of the axle bearing 11, there is no increase in the transverse dimensions in spite of a large bearing capacity.

Thus the invention permits the axle reduction casing to be designed compact while providing a large reduction ratio, thereby securing sufficient space in lower portions of the tractor. Owing to this advantageous feature the invention, when employed for front wheel drive, allows the front wheels to be turned by an increased angle.

Further, the front wheels, even if they are drive wheels, can be turned by a great angle since, in addition to the compactness of the reduction casing 4 as noted above, the drive shaft 26 and the input gear 14 are operatively interconnected through the king pin shaft 31, and the axle reduction casing 4 is oscillatable about the axis of the king pin shaft 31.

I claim:

1. An axle reduction apparatus for a tractor comprising:
   an axle reduction casing (4) which supports a ring gear (7) and includes first (6) and second (5) casing members detachably attached to each other with said ring gear secured therebetween;
   an axle (10) having inner and outer end portions disposed centrally of said axle reduction casing;
   first bearing means (12) supported in said first casing member for receiving said outer end portion of said axle;
   second bearing means (11) supported in said second casing member for receiving said inner end portion of said axle;
   an integrated gear (13) fitted on an outer surface of said axle for relative rotation with respect thereto, said integrated gear including an input gear (14) and a sun gear (15) formed integrally relative to each other;
   a carrier member (17) fixedly secured on the outer surface of said axle outwardly adjacent to said sun gear, said carrier carrying planet gears (18) in mesh with said sun and ring gears, respectively;
   third bearing means (21) supported on said carrier member between said carrier member and said integrated gear; and
   fourth bearing means (16) supported outwardly of said second bearing means, said integrated gear being supported on said fourth bearing means.

2. The apparatus of claim 1 wherein said integrated gear is provided with a boss portion (20) and said third bearing means comprises a needle bearing arranged between said axle and said boss portion.

3. The apparatus of claim 1 wherein said integrated gear is provided with a boss portion (20) and said third bearing means comprises a needle bearing disposed between said boss portion and said carrier.

4. The apparatus of claim 1 wherein
said axle reduction casing is secured to a transmission casing (29) which includes a housing, a drive shaft (26) and king pin means (31) having an axis, said king pin means arranged to support upper (32) and lower (34) beveled pinions, said lower beveled pinion in engagement with said integrated gear and said upper bevel gear in engagement with means carried by said drive shaft whereby said transmission casing is oscillatable about said axis of said king pin means.

5. The apparatus of claim 1 wherein
said fourth bearing means is concentric with said second bearing means and supported by said second casing member.

6. The apparatus of claim 5 wherein
said integrated gear is provided with a boss portion (20), said third bearing means is disposed between said boss portion and said carrier; and said third and said fourth bearing means comprise needle bearings.

7. The apparatus of claim 6 wherein
said axle reduction casing is secured to a transmission casing (29) which includes a housing, a drive shaft (26) and king pin means (31) having an axis, said king pin means arranged to support upper (32) and lower (34) beveled pinions, said lower beveled pinion in engagement with said integrated gear and said upper bevel gear in engagement with means carried by said drive shaft whereby said transmission casing is oscillatable about said axis of said king pin means.

* * * * *